(12) United States Patent
Yeh et al.

(10) Patent No.: US 10,521,879 B2
(45) Date of Patent: Dec. 31, 2019

(54) OVERLAYING MULTI-SOURCE MEDIA IN VRAM

(71) Applicant: Ubitus, Inc., Grand Cayman (KY)

(72) Inventors: Chung-Chou Yeh, Taipei (TW); Yu-Ju Tseng, Taipei (TW); Kai-Fang Cheng, Taipei (TW)

(73) Assignee: Ubitus, Inc., Grand Cayman (KY)

( * ) Notice: Subject to any disclaimer, the term of this patent is extended or adjusted under 35 U.S.C. 154(b) by 0 days.

(21) Appl. No.: 16/389,209

(22) Filed: Apr. 19, 2019

(65) Prior Publication Data

US 2019/0259130 A1    Aug. 22, 2019

Related U.S. Application Data (63) Continuation-in-part of application No. 15/971,640, filed on May 4, 2018, now Pat. No. 10,332,296, which is a continuation-in-part of application No. 15/202,080, filed on Jul. 5, 2016, now abandoned.

(51) Int. Cl.
| | |
|---|---|
| *G06T 1/20* | (2006.01) |
| *G06T 11/60* | (2006.01) |
| *G06T 1/60* | (2006.01) |
| *A63F 13/537* | (2014.01) |
| *A63F 13/355* | (2014.01) |
| *H04L 29/08* | (2006.01) |

(52) U.S. Cl.
CPC .............. *G06T 1/20* (2013.01); *A63F 13/355* (2014.09); *A63F 13/537* (2014.09); *G06T 1/60* (2013.01); *G06T 11/60* (2013.01); *H04L 67/10* (2013.01)

(58) Field of Classification Search
CPC ................. G09G 5/14; G09G 2340/10; G09G 2340/125; G06T 11/60; H04N 5/44504
See application file for complete search history.

(56) References Cited

U.S. PATENT DOCUMENTS

| | | | |
|---|---|---|---|
| 2013/0311308 A1* | 11/2013 | Huang | G06Q 30/0251 705/14.73 |
| 2017/0064217 A1* | 3/2017 | Ota | H04N 5/2628 |
| 2017/0286279 A1* | 10/2017 | Allison | G06F 11/3688 |
| 2018/0147483 A1* | 5/2018 | Osman | A63F 13/00 |

* cited by examiner

*Primary Examiner* — Todd Buttram (57) ABSTRACT

Methods, apparatuses, and computer program products for overlaying multisource media in VRAM are described. The primary media source is rendered in VRAM by an application program, and then the secondary media source(s) are rendered and blended to the primary source in VRAM at the same location of the primary source in VRAM, so no extra buffer is needed. This improves system performance and reduces power consumption, through reduced system bus, system memory, and CPU usage.

12 Claims, 11 Drawing Sheets

OVERLAYING MULTI-SOURCE MEDIA IN VRAM

RELATED APPLICATIONS

This application is a continuation-in-part of U.S. application Ser. No. 15/971,640 filed May 4, 2018 which is a continuation-in-part of U.S. application Ser. No. 15/202,080 filed Jul. 5, 2016. The entire contents of the applications are hereby incorporated herein by reference.

BACKGROUND

A platform, such as a cloud content platform, may need to deliver multiple multimedia content items to a target device simultaneously.

For example, a cloud gaming platform may need to stream a game scene with an advertisement to customers' devices. The game scene and the advertisement may come from different video sources. It may be desired that the advertisement is overlaid on the game scene, or that the game scene is underlaid beneath the advertisement.

The conventional overlay/underlay process may work like this: Capture a primary image from a primary video source, for example a game, and copy it to a frame buffer in System RAM. Then capture an overlay/underlay (second) image from the overlay/underlay (second) video source, for example an advertisement and blend the overlay/underlay image onto the primary image in the frame buffer. Finally, encode the new image in the frame buffer into the target video. The capturing, copying, and blending require significant extra effort by the system. System bus, system memory, and CPU resources are impacted. In a high CCU (concurrent user) system, this extra effort can cause low performance and high power consumption by the server.

Therefore, a new and improved system and method is desired to provide a more efficient overlay/underlay process.

SUMMARY

Embodiments of the present invention provide systems and methods for efficiently overlaying multimedia content on a video source generated by an application program.

Embodiments of the present invention also provide systems and methods for efficiently underlaying multimedia content beneath such a video source, or for blending multimedia content with the video source.

According to embodiments of the present invention, there is provided a multimedia content processing system and a multimedia content processing method, which perform the overlay/underlay in. VRAM, thereby reducing system bus, system memory, and CPU usage.

In embodiments of the inventive system and method, the primary source is rendered in VRAM by an application program, and then the overlay/underlay source(s) are rendered and blended to the primary source in VRAM at a specified time and position.

The blending is performed at the same location of the primary source in VRAM, so no extra buffer is needed. This improves system performance and reduces power consumption, through reduced system bus, system memory, and CPU usage.

The overlay/underlay result is sent to a video back buffer or frame buffer and then encoded and sent to system RAM, directly presented on a display device, or fed back to the same VRAM location as part of an iterative overlay process.

DETAILED DESCRIPTION

Embodiments of the present invention provide a system and method to overlay/underlay multimedia contents on a video source generated by an application program without requiring an extra buffer.

Figure 1:
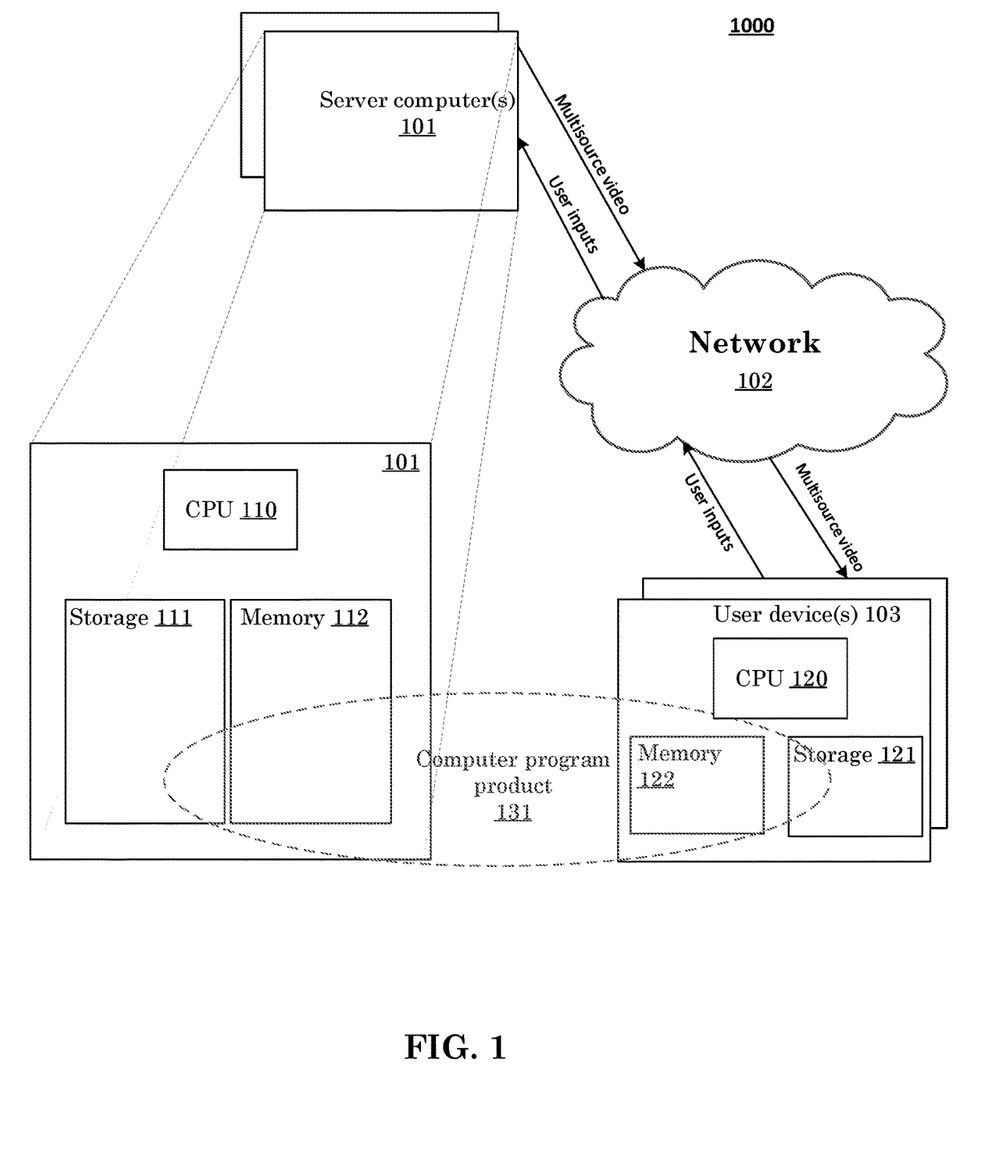
FIG. 1 is a block diagram of a distributed client-server computer system 1000 supporting interactive multisource multimedia applications according to one embodiment of the present invention.

FIG. 1 is a block diagram of a distributed client-server computer system 1000 supporting multimedia applications according to one embodiment of the present invention. Computer system 1000 includes one or more server computers 101 and one or more user devices 103 configured by a computer program product 131. Computer program product 131 may be provided in a transitory or non-transitory computer readable medium; however, in a particular embodiment, it is provided in a non-transitory computer readable medium, e.g., persistent (i.e., non-volatile) storage, volatile memory (e.g., random access memory), or various other well-known non-transitory computer readable mediums.

User device 103 includes central processing unit (CPU) 120, memory 122 and storage 121. User device 103 also includes an input and output (I/O) subsystem (not separately shown in the drawing) (including e.g., a display or a touch enabled display, keyboard, d-pad, a trackball, touchpad, joystick, microphone, and/or other user interface devices and associated controller circuitry and/or software). User device 103 may include any type of electronic device capable of providing media content. Some examples include desktop computers and portable electronic devices such as mobile phones, smartphones, multi-media players, e-readers, tablet/touchpad, notebook, or laptop PCs, smart televisions, smart watches, head mounted displays, and other communication devices.

Server computer 101 includes central processing unit CPU 110, storage 111 and memory 112 (and may include an I/O subsystem not separately shown). Server computer 101 may be any computing device capable of hosting computer product 131 for communicating with one or more client computers such as, for example, user device 103, over a network such as, for example, network 102 (e.g., the Internet). Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 122 may include any known computer memory device. Storage 111 and 121 may include any known computer storage device.

Although not illustrated, memory 112 and 122 and/or storage 111 and 121 may also include any data storage equipment accessible by the server computer 101 and user device 103, respectively, such as any memory that is removable or portable, (e.g., flash memory or external hard disk drives), or any data storage hosted by a third party (e.g., cloud storage), and is not limited thereto.

User device(s) 103 and server computer(s) 101 access and communicate via the network 102. Network 102 includes a wired or wireless connection, including Wide Area Networks (WANs) and cellular networks or any other type of computer network used for communication between devices.

In the illustrated embodiment, computer program product 131 in fact represents computer program products or computer program product portions configured for execution on, respectively, server 101 and user device 103.

Figure 2:
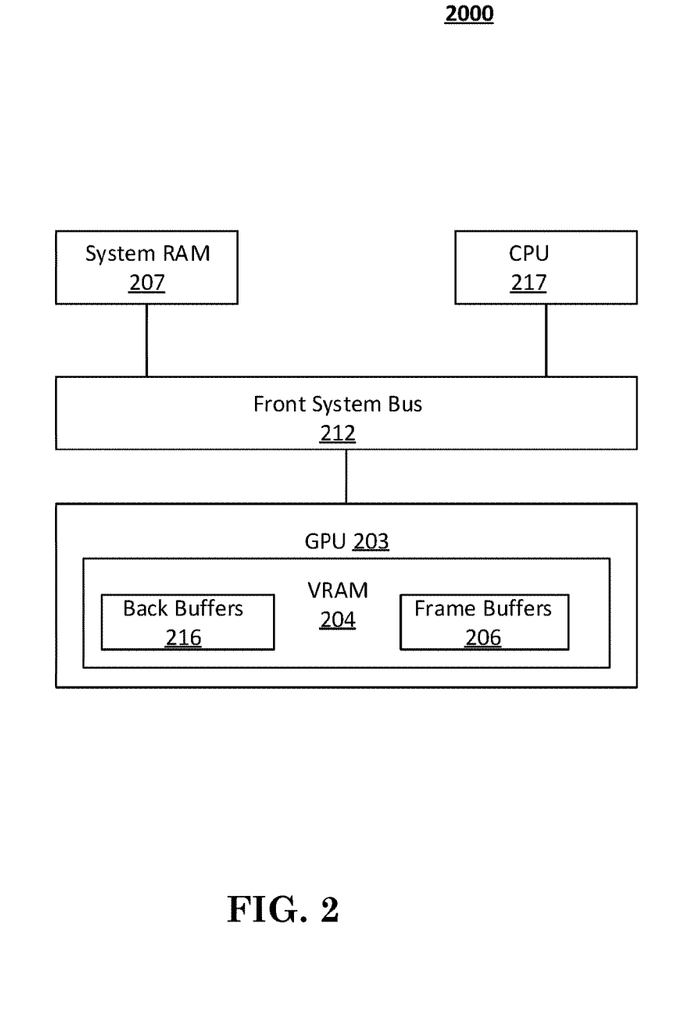
FIG. 2 is a system architecture diagram of a video processing system, in which an embodiment of the present invention may be implemented, comprising a Graphics Processing Unit (GPU) and Video Random Access Memory (VRAM).

FIG. 2 is a system architecture diagram of a video processing system 2000. Embodiments of video processing system 2000 comprise system elements that are optimized for video processing, in particular including a Graphics Processing Unit (GPU) 203 and Video Random Access Memory (VRAM) 204.

In some embodiments, video processing system 2000 also includes conventional computing elements that are not necessarily optimized for video processing, such as CPU 217 and System RAM 207.

In some embodiments, VRAM 204 comprises one or more buffers, such as Frame Buffers 206 and/or Back Buffers 216. In general, a Frame Buffer 206 is a region in memory large enough to store a complete frame of video data. Frame buffers can also be defined in other memory elements, such as System RAM 207. In some embodiments, additional buffers such as Back Buffers 216 may be provided by, for example, defining a suitable memory region in VRAM 204. In some embodiments, one or more Back Buffers 216 may be provided to support a double buffering function, in order to reduce flickering in a video display. In some embodiments, Back Buffers 216 may serve to store the results of rendering and/or blending operations, as further described below.

Video processing system 2000 may further comprise one or more interconnect mechanisms or buses, such as Front System Bus 212, in order to directly or indirectly interconnect entities such as GPU 203, VRAM 204, CPU 217, and System RAM 207.

Figure 3:
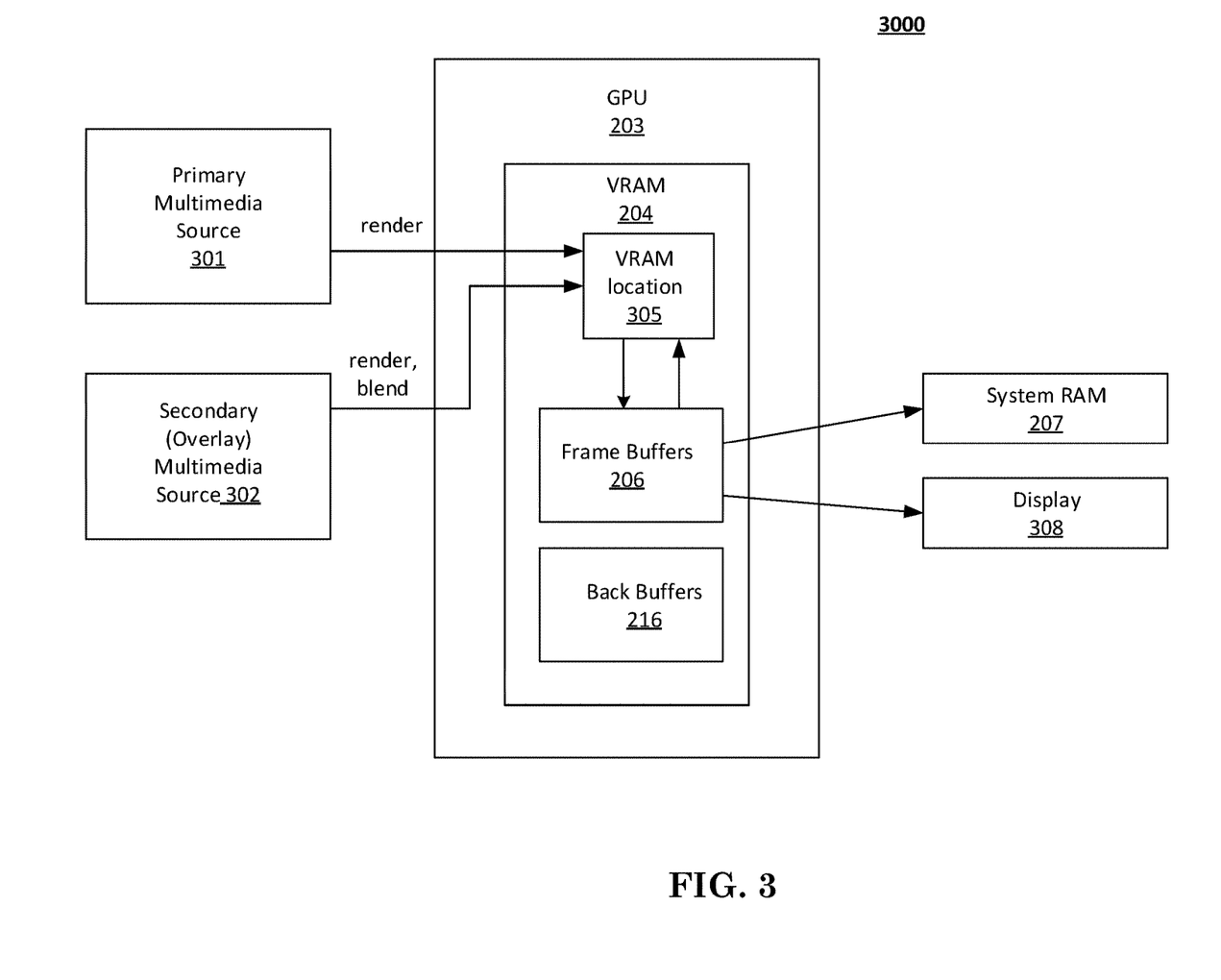
FIG. 3 is a block diagram of a system for overlaying multimedia contents on a primary source, in accordance with an embodiment of the present invention.

FIG. 3 is a high-level block diagram of a system 3000 for overlaying multisource media according to some embodiments of the present invention.

In the depicted embodiment of system 3000, Graphics Processing Unit (GPU) 203 comprises Video Random Access Memory (VRAM) 204 which in turn comprises Frame Buffer(s) 206. In general, Frame Buffer 206 is a region in memory large enough to store a complete frame of video data. VRAM 204 may comprise more than one Frame Buffer 206. As noted above, frame buffers can also be defined in other memory elements, such as System RAM 207.

In some embodiments, the processes described herein may be performed in a digital device comprising memory and a processing unit that is not described as a GPU or is actually not a GPU. In some embodiments, the GPU is part of a server. In some embodiments a server comprising a GPU is a cloud-based server. In some embodiments the GPU is part of a client device.

Primary Source 301 comprises, for example, graphics objects such as vertexes, texture, shading, mesh, etc. In a preferred embodiment, Primary Source 301 is generated by an application program and is directly rendered in VRAM 204 at VRAM location 305. In some embodiments, VRAM Location 305 comprises one of Back Buffers 216. In another embodiment, VRAM Location 305 comprises Frame Buffer 206. In one embodiment, Primary Source 301 is output from a game application. Because Primary Source 301 is directly rendered in VRAM 204, no resources need be expended in "capturing" Primary Source 301. In other embodiments, Primary Source 301 is rendered elsewhere and copied into VRAM 204.

Secondary Multimedia Source 302 can be an item of visual or multimedia content that is to be overlaid on Primary Source 301. In an embodiment, Secondary Multimedia Source 302 comprises graphics objects such as vertexes, texture, shading, mesh, etc. In one embodiment, Secondary Source 302 is generated by an application program and is directly rendered in. VRAM 204. In some embodiments, Secondary Source 302 is rendered in VRAM Location 305. In some embodiments, Secondary Source 302 is generated by the same application program that generates Primary Source 301. In other embodiments, Secondary Source 302 is generated by a different application program. In still other embodiments, Secondary Source 302 can be the output of a hardware device such as a TV card. In such embodiments it may be necessary to capture Secondary Source 302 in System RAM 207 and upload it to VRAM Location 305.

In one example, Secondary Multimedia Source 302 is an advertisement that is to be overlaid on Primary Source 301. In other embodiments, Secondary Multimedia Source 302 is to be underlaid under Primary Source 301. In other embodiments, Secondary Multimedia Source 302 is to be blended with Primary Source 301 in an intermediate manner, so that, for example, both sources are visible to some degree.

In VRAM 204, one or more secondary sources 302 are blended with Primary Source 301 at a specified time and position. In some embodiments, Primary Source 301 provides time and position references to Secondary Source 302. In some embodiments, blending takes place at the same VRAM location 305 in VRAM 204 where Primary Source 301 was rendered, so no extra buffer need be used for the blending process. In some embodiments, rendering of Primary Source 301, rendering of Secondary Source 302, and blending of Primary Source 301 and Secondary Source 302 to produce a target image all take place in the same VRAM location 305. In some embodiments, rendering of Primary Source 301 and Secondary Source 302 in the same location accomplishes the desired blending, and there is no separate blending step.

After the blending process completes, in some embodiments, the target image produced by the blending process is sent to Frame Buffer 206. In some embodiments, where rendering and blending take place in Frame Buffer 206, the target image will already be in Frame Buffer 206. As a next step, the target image can be encoded to form part of the target video. The target video can then be sent to System RAM 207. In some embodiments, the target video may be sent to one of Back Buffers 216. In other embodiments, the target video may be sent directly to Display 308. In other embodiments, the target video may be rendered back to VRAM Location 305 in an iterative process, for example to accomplish multiple overlays. This option is depicted in FIG. 3 as a data path back to VRAM location 305 from Frame Buffer 206. Multiple overlays may be used, for example, to render a 3D surface or texture.

Figure 4:
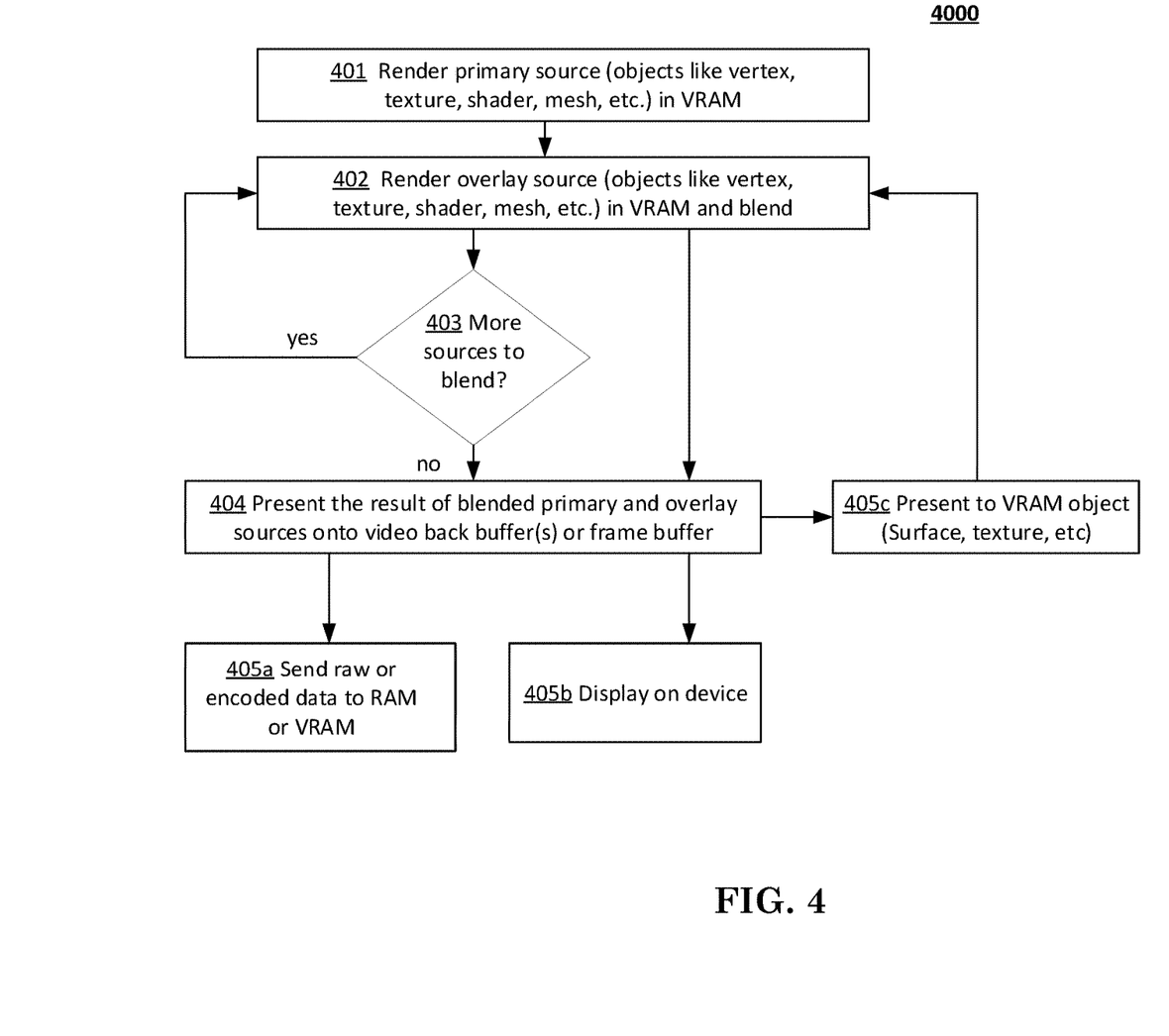
FIG. 4 is a flow diagram of a method for overlaying multimedia contents on a primary source, in accordance with an embodiment of the present invention.

FIG. 4 illustrates a process 4000 for overlaying multi-source media according to some embodiments of the present invention.

In step 401, a primary source, comprising objects such as vertexes, texture, shading, or a mesh is rendered in VRAM. In step 402, an overlay/underlay source is also rendered in VRAM and is blended with the primary source in the same VRAM location. In some embodiments, the VRAM location will correspond to one of Back Buffers 216. In some embodiments, the VRAM location will correspond to one or more of Frame Buffers 206. In other embodiments, the VRAM location will correspond to another location, different from a back buffer or frame buffer location. In at least some embodiments, rendering of the primary source and overlay/underlay source in the same location accomplishes the desired blending, and there is no separate blending step.

If there are more overlay/underlay sources, steps 402 and 403 will be repeated until all overlay/underlay sources are rendered and blended.

In step 404, the overlay/underlay result is presented in a video back buffer(s) or a frame buffer. In embodiments where the blending process takes place in a back buffer or frame buffer, step 404 may involve little or no additional work. In other embodiments, step 404 comprises sending the overlay/underlay result from VRAM Location 305 to a back buffer or frame buffer.

Steps 405*a*, 405*b*, and 405*c* illustrate alternative next steps of process 4000. At 405*a*, encoded video or raw video data is sent to system RAM or to VRAM. Raw video data might be output, for example, for a follow-on software encoding step (not shown) in the case where the GPU does not support a specific encoding format. At 405*b*, the overlay/underlay result is directly presented on a display device. At 405*c*, the overlay/underlay result is fed back to step 402 one or more times in order to accomplish multiple overlays through an iterative process.

Overlaying Interactive Content onto Game Application for Cloud Gaming

Figure 5:
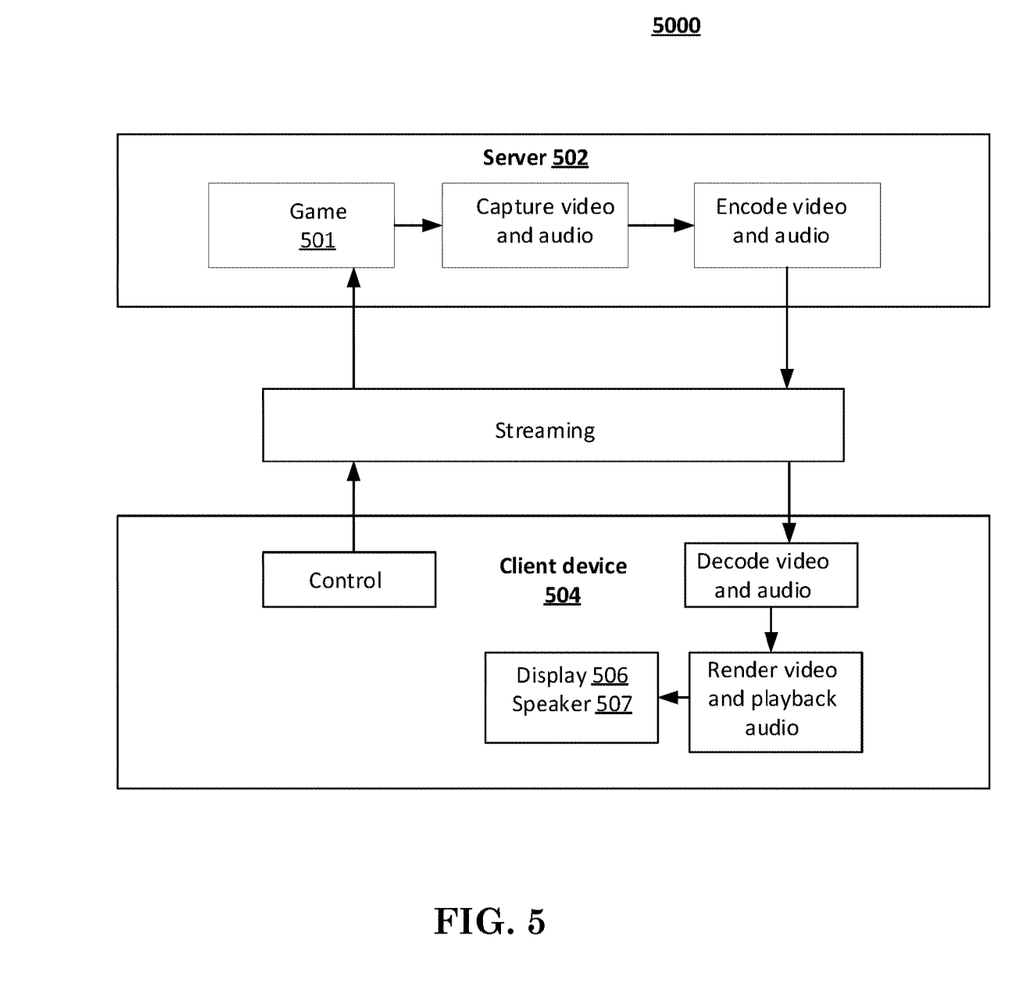
FIG. 5 illustrates a cloud gaming system and method, in accordance with embodiments of the presently claimed invention.

Cloud gaming is a type of online gaming. It is also called "game on demand." Cloud gaming basically proceeds according to the following steps (please refer to FIG. 5):

(1) Server 502 captures video and audio output of game 501.

(2) Server 502 encodes the video and audio to compressed data.

(3) Server 502 streams encoded (compressed) video and audio to client device 504.

(4) Client device 504 decodes the video and audio data.

(5) Client device 504 renders the video content to display 506 and plays back the audio content to speaker 507.

(6) Client device 504 sends control data to server 502.

In some embodiments server 502 is a cloud-based server. In some embodiments, game 501 is implemented as software running in the cloud on server 502. Each client (user) device 504, which may be, for example, a personal computer (PC), laptop, tablet, smart phone, game console, etc., has its own unique way to interact with game 501. In particular, the user interface design for a given device 504 is based on the functionalities of that device. Because it is an aim of cloud gaming to transfer game content to different types of device 504, in general additional user interface functionality is required to work with different instances of device 504. In some embodiments, the additional user interface functionality is provided by overlaying one or more user interfaces on the game video content output by game 501, without the need to modify the game 501 application.

Below we describe how additional content can overlay game video content without modifications to the game application. First, we will examine in more detail the capture and encoding steps introduced above, highlighting the advantages of exploiting the Graphics Processing Unit (GPU) and associated Video Random Access Memory (VRAM) in performing these steps.

Figure 6:
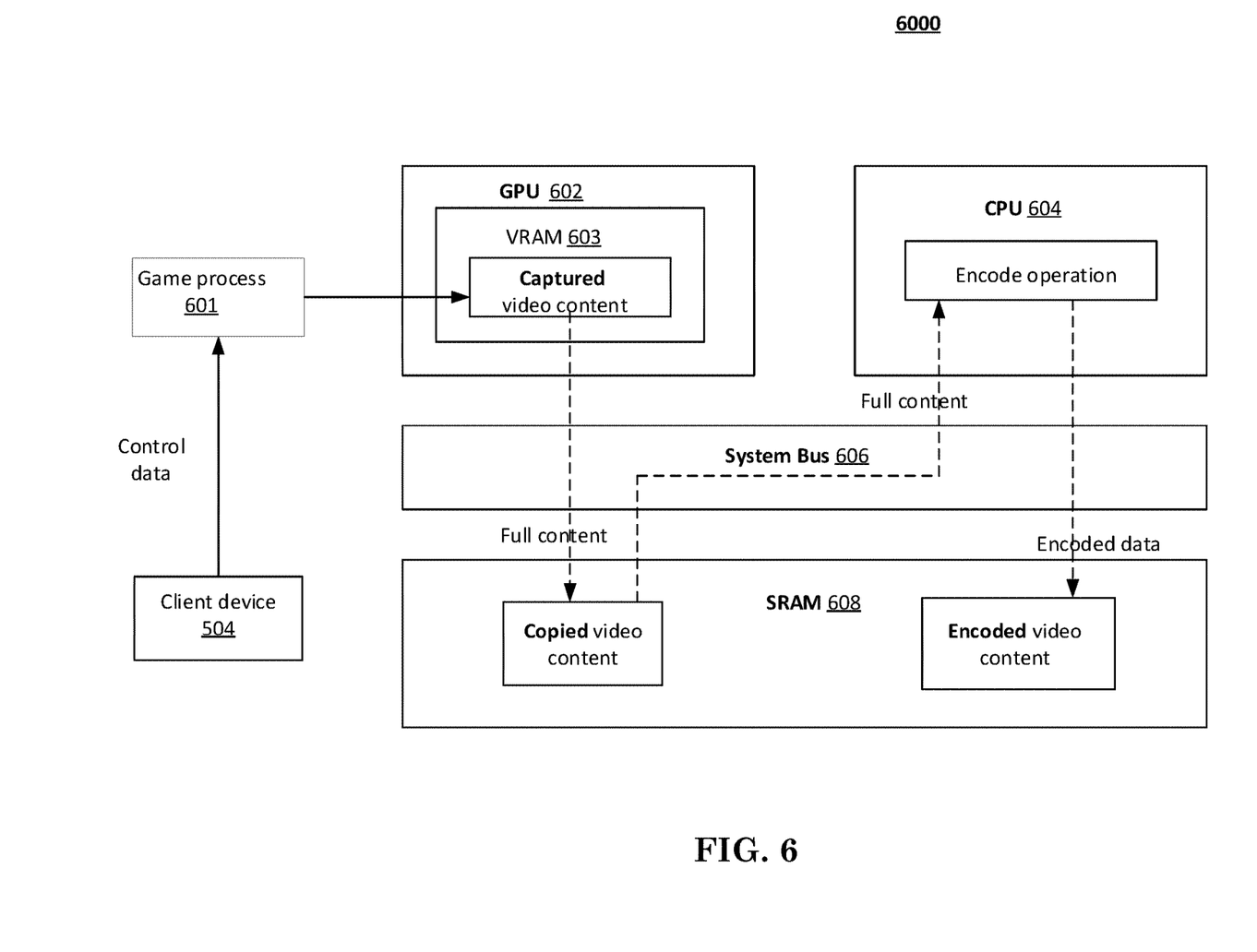
FIG. 6 illustrates a non-VRAM method of encoding video and audio content, according to embodiments of the presently claimed invention.

FIG. 6 illustrates a non-VRAM method of encoding video and audio content, in a system 6000 comprising GPU (Graphics Processing Unit) 602, VRAM (Video Random Access Memory) 603, CPU (Central Processing Unit) 604, System Bus 606, and SRAM (System Random Access Memory) 608. This method comprises 2 major steps: 1) Copy the video content from VRAM 603 to SRAM 608; and 2) Encode the copied video content from SRAM 608 in CPU 604.

This method of capturing and encoding video content exacts a very large performance penalty, because raw (unencoded) video data has to pass over System Bus 606. In fact, as shown, the raw video data passes over System Bus 606 twice.

Figure 7:
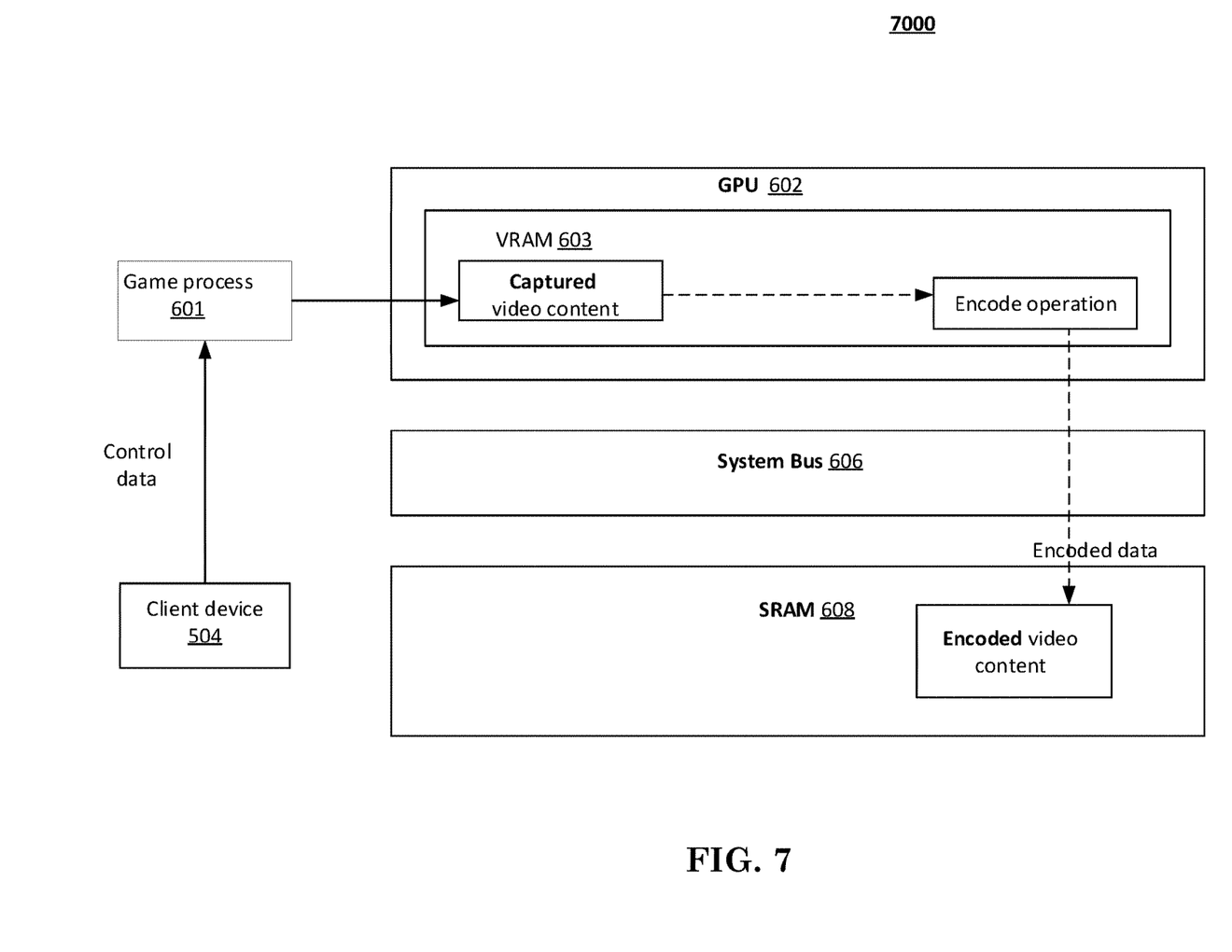
FIG. 7 illustrates a VRAM-based method of encoding video and audio content, according to embodiments of the presently claimed invention.

FIG. 7 illustrates an improved method of encoding video and audio content in a system 7000 that takes greater advantage of the capabilities afforded by GPU 602 and associated VRAM 603.

Here, as may be seen in FIG. 7, video content is captured in VRAM, as before, but then remains in VRAM, where the encoding operation is performed using GPU and VRAM resources. The encoded video data is then sent over system bus 606 to SRAM 608. Thus, instead of carrying raw video data twice for each encode operation, system bus 606 carries encoded (compressed) video data once. This results in resource savings for CPU 604 and SRAM 608, as well as system bus 608 resource savings.

Figure 8:
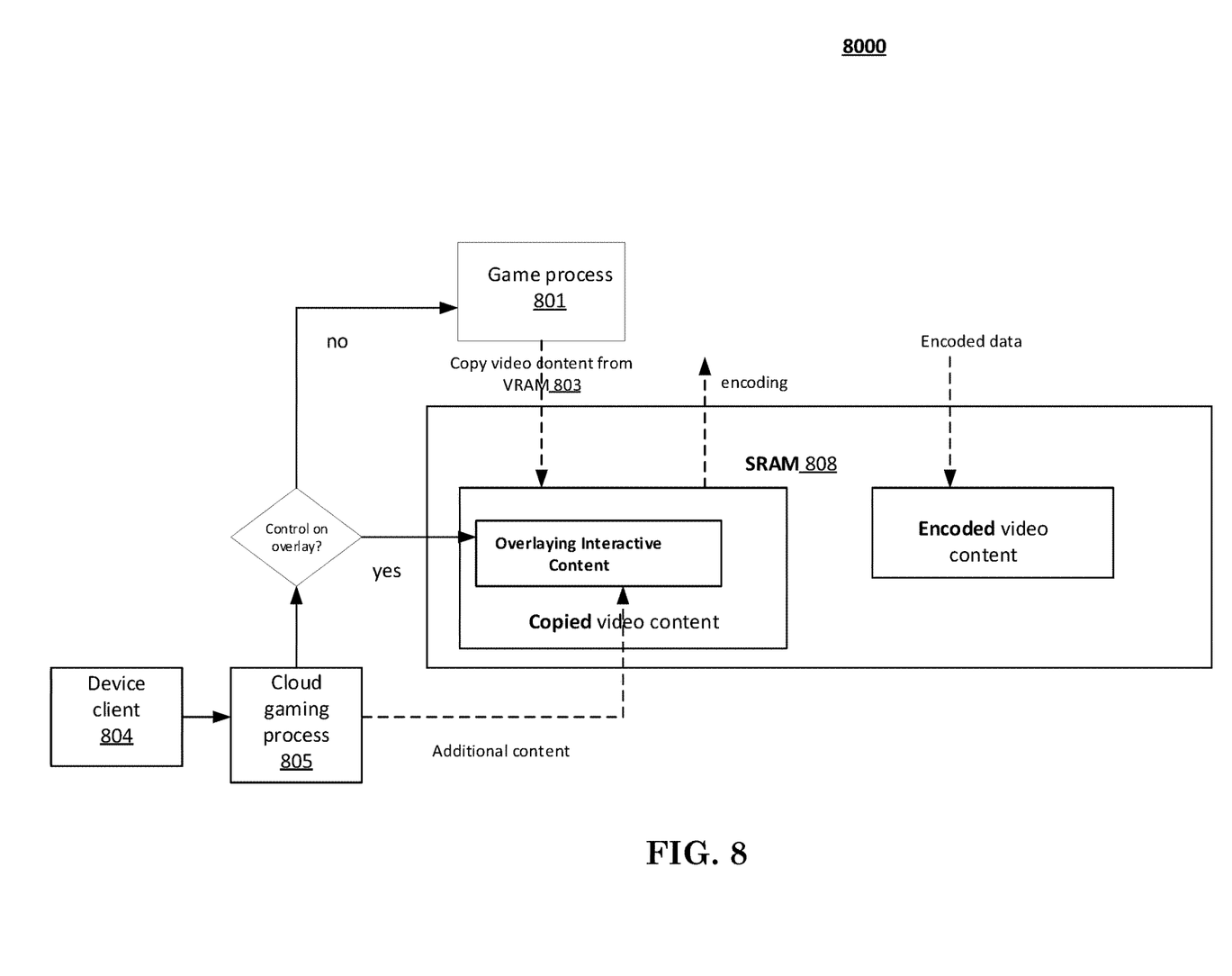
FIG. 8 illustrates a system and method for overlaying interactive content in SRAM, according to embodiments of the presently claimed invention.
Figure 9:
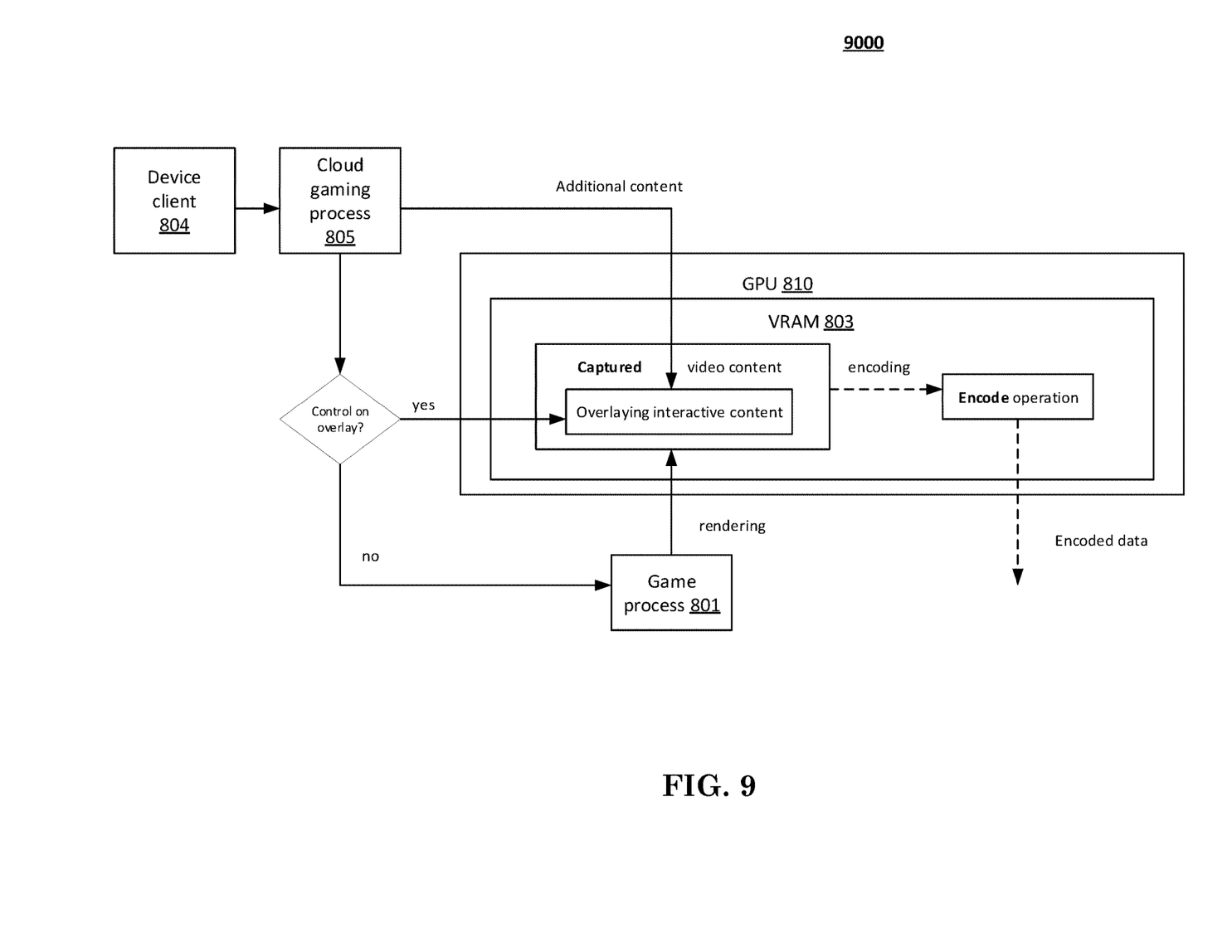
FIG. 9 illustrates a system and method for overlaying interactive content in VRAM, according to embodiments of the presently claimed invention.

FIGS. 8 and 9 illustrate methods and apparatus for overlaying additional interactive content in cloud gaming applications, according to some embodiments of the presently claimed invention. In some embodiments overlaid additional interactive content comprises a user interface (UI). In some embodiments overlaid content comprises extra content. In some embodiments overlaid additional interactive content comprises interactive control. In preferred embodiments, such as those illustrated in FIG. 9, GPU resources and VRAM are exploited to overlay cloud gaming-specific content and provide the user with an improved gaming experience.

Game process 801 comprises, for example, the target process or application which provides content to a user.

Cloud gaming process 805 facilitates remote play of the game by, for example, providing content to a user and inputting remote control from a user. Cloud gaming process 805 communicates with the game process by injecting code within game process 801. In some embodiments, cloud gaming process 805 decides which overlay to draw. In some embodiments, cloud gaming process 805 passes user control information to injected code.

Cloud gaming process 805 communicates with device client 804 (also referred to as client device 804), which is a hardware device, such as a smartphone, set-top box, or gaming console. In some embodiments, cloud gaming process 805 helps to stream encoded video data to device client 804.

In some embodiments, overlaid interactive content comprises one or more displayed advertisements. In some embodiments, overlaid interactive content comprises a device control interface customized to fit one or more particular devices. In some embodiments, overlaid content comprises one or more output video sources.

Preferably, the illustrated methods and apparatus provide a cloud gaming service that uses process interception to run within a game application, without requiring modification of the game application. In some embodiments, the cloud gaming service employs a dynamic link library injection technique (DLL Injection) to facilitate running within a game application (or other application). In some embodiments, the cloud gaming service employs a "hooking" technique to facilitate running within a game application (or other application).

See https://en.wikipedia.org/wiki/DLL_injection: "In computer programming, DLL injection is a technique used for running code within the address space of another process by forcing it to load a dynamic-link library."

See https://en.wikipedia.org/wiki/Hooking: "In computer programming, the term hooking covers a range of techniques used to alter or augment the behavior of an operating system, of applications, or of other software components by intercepting function calls or messages or events passed between software components. Code that handles such intercepted function calls, events or messages is called a hook."

In some embodiments, the cloud gaming service employs both DLL Injection and hooking to facilitate running within an application, such as a game application.

In preferred embodiments, the cloud gaming service is able to create the same type of rendered target content as a game application that uses standard graphics APIs such as DirectX or OpenGL. Preferably, the cloud gaming service utilizes one or more embodiments of the presently claimed invention to provide the user with one or more of an on-screen keyboard, a virtual mouse, dialog information and one or more advertisements. In embodiments of the presently claimed invention, additional user interface functionality and information, such as the on-screen keyboard, virtual mouse, dialog information, and advertisements can be provided without modification of the game application.

FIG. 8 illustrates methods and apparatus for overlaying interactive content in SRAM (System Random Access Memory) 808. Interactive content can include, for example, media or gaming content in which the content can respond to user control actions. In the method of FIG. 8, the overlay is generated in SRAM 808 and the overlay is blended to the game video content before encoding. This method is relatively low-level and consumes relatively more processing time and other resources. User control data is passed to cloud gaming process 805. If the overlay includes user control data, it will be handled by cloud gaming process 805 before passing to game process 801. In the method of FIG. 8, encoding can be handled by a CPU or in VRAM (not shown).

FIG. 9 illustrates methods and apparatus for overlaying interactive content on VRAM (Video Random Access Memory) 803. In this method, the cloud gaming service directly creates a compatible overlay surface in VRAM 803 and blends the overlay surface to the game content. This saves processing time and resources by eliminating the need to copy content from VRAM 803 to SRAM 808 and eliminating the need to perform the blending operation in the SRAM 808 and CPU 604.

A compatible overlay surface is, for example, one which is compatible with the existing game application. For example, if the game application uses the DirectX9 API, then the cloud gaming services will also use DirectX9 for compatibility.

In FIG. 9, the output from Game process 801 labeled "rendering" represents rendering by the game application. In some embodiments, the cloud gaming service "hooks" the game application at the end of each game rendering operation, causing the game to actively call the injection code of the cloud gaming service. See discussion of "hooking" and DLL Injection above.

In the embodiment of FIG. 9, encoding is preferably carried out by the GPU within VRAM 803 without the need to transfer said blended video content to the SRAM. Encoded data (which may be compressed data) is then sent to, for example, Client device 804, which may be located remotely.

Figure 10:
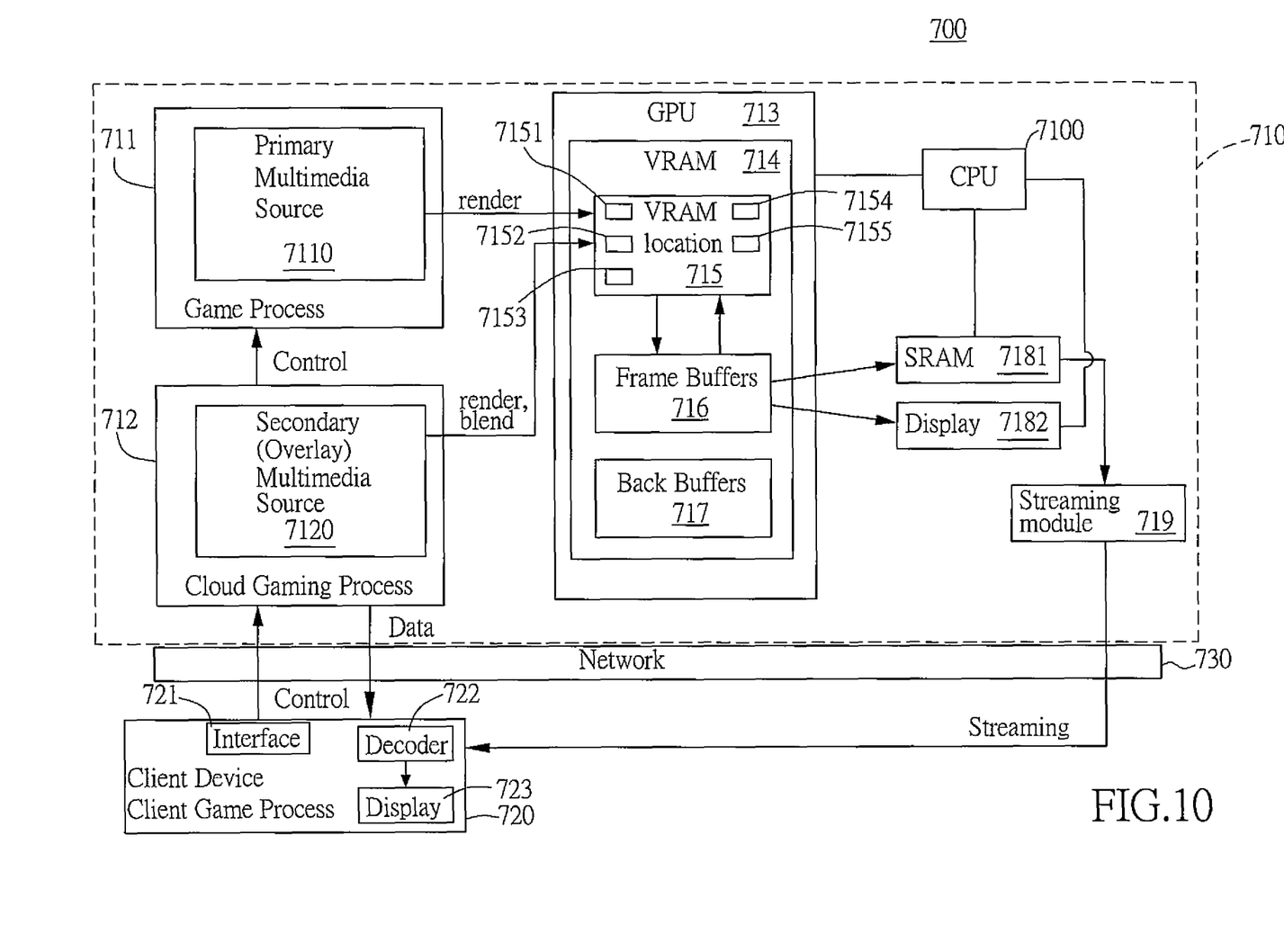
FIG. 10 is a block diagram of a system for overlaying multi-source media in VRAM, in accordance with another embodiment of the present invention.

FIG. 10 is a block diagram of a system 700 for overlaying multi-source media in VRAM, in accordance with another embodiment of the present invention. The system 700 comprises at least one computer 710 and at least one client device 720 remote from the computer 710. The client device communicates with the computer 710 via a network 730. The computer 710 comprises a central processing unit (CPU) 7100, a system random access memory (SRAM) 7181, a display 7182, and streaming module 719, and a graphic processing unit (GPU) 713 having a video random access memory (VRAM) 714 built therein. VRAM 714 comprises frame buffer(s) 716 and/or back buffer(s) 717. In general, frame buffer 716 is a region in memory large enough to store a complete frame of video data. VRAM 714 may comprise more than one frame buffer 716 and back buffer 717. As noted above, frame buffers can also be defined in other memory elements, such as SRAM 7181. In this embodiment, the computer is a cloud-based server comprising a plurality of GPUs 713.

The primary multimedia source 7110 is generated by a game process 711 (also referred as the first process hereinafter) of a game application executed by the computer 710. The computer 710 executes the game application for utilizing the first process (game process 711) to generate a video content according to the primary multimedia source 7110. The primary multimedia source 7110 generated by the game process 711 comprises a plurality of first multimedia content items 7151, 7152, 7153, for example, graphics objects such as vertexes, texture, shading, mesh, etc. The GPU 713 captures the first multimedia content items 7151, 7152, 7153 of the video content generated by the first process (game process 711) and directly stores the captured first multimedia content items 7151, 7152, 7153 into a VRAM location 715 of the VRAM 714. These first multimedia content items 7151, 7152, 7153 are directly rendered in VRAM 714 at VRAM location 715. In this embodiment, the VRAM location 715 is configured and managed by the game process 711 of the game application. Because first multimedia content items 7151, 7152, 7153 of primary multimedia source 7110 are directly rendered in VRAM 714, no resources need be expended in "capturing" primary multimedia source 7110. That is, there is no need to transmit these first multimedia content items 7151, 7152, 7153 to the SRAM 7181 for rendering process.

The secondary multimedia source 7120 is generated by a cloud gaming process 712 (also referred as the second process hereinafter). The secondary multimedia source 7120 generated by the cloud gaming process 712 comprises a plurality of second multimedia content items 7154, 7155 which can be items of visual or multimedia contents that are to be overlaid on the video content of the primary multimedia source 7110. The second process (cloud gaming process 712) creates one or more compatible overlay surfaces on the VRAM location 715. The compatible overlay surfaces contain the second multimedia content items 7154, 7155. In an embodiment, the second multimedia content items 7154, 7155 comprises graphics objects such as vertexes, texture, shading, mesh, etc. In this embodiment, the cloud gaming process 712 is performed by a cloud gaming application which is independent from the game application, such that the feature for overlaying multi-source media in VRAM can be achieved without the need to modify the game application. The game application 711 and the cloud gaming application 712 both comprises instructions which are stored in non-transitory computer-readable medium, such like hard disk, solid-state disk (SSD), flash disk or optical disk, and are executable by the computer 710. However, it is another embodiment of the present invention to modify the game application such that it can perform both the game process 711 and the cloud gaming process 712. In this embodiment, the second multimedia content items 7154, 7155 of the secondary multimedia source 7120 is directly rendered in VRAM location 715 of VRAM 714, such that, there is no need to transmit these second multimedia content items 7154, 7155 to the SRAM 7181 for rendering process.

In this embodiment, the GPU 713 directly blends the compatible overlay surface created by the second process to the video content generated by the first process and stores the blended video content into the frame buffer 716 of the VRAM 714 without the need to transfer the first multimedia content items 7151, 7152, 7153 and the second multimedia content items 7154, 7155 to the SRAM 7181. The video storage format of the compatible overlay surface is compatible to the video storage format of the blended video content stored in said frame buffer 716. In this embodiment, blending of the secondary multimedia source 7120 takes place at the same VRAM location 715 in VRAM 714 where primary multimedia source 7110 was rendered, so no extra buffer need be used for the blending process. That is, rendering of primary multimedia source 7110, rendering of secondary multimedia source 7120, and blending of primary multimedia source 7110 and secondary multimedia source 7120 to produce a target image (also referred as the blended video content) all take place in the same VRAM location 715. Preferably, rendering of primary multimedia source 7110 and secondary multimedia source 7120 in the same VRAM location 715 accomplishes the desired blending, and there is no separate blending step.

After the blending process completes, the target image (blended video content) produced by the blending process is sent to the frame buffer 716. In some embodiments, where rendering and blending take place in the frame buffer 716, the target image will already be in the frame buffer 716. As a next step, the target image can be encoded to form part of the target video. The target video can then be sent to one of the following: SRAM 7181, back buffers 717, display 7182, or be sent back to VRAM location 715 in an iterative process for accomplish multiple overlays. In this embodiment, the encoded target image (also referred as the encoded blended video content) is processed by the streaming module 719 to form video streaming which is transmitted to the client device 720 via the network 730. The client device 720 executes a client game process to cooperate with both the cloud gaming process and the game process of the computer 710, and receives and decodes the encoded target image by using a decoder 722, and then displays the decoded target image on the display 723 of the client device 721.

In this embodiment, the client device 721 comprises an interface 721 which further comprises a user interface and a communication interface. The user interface accepts user's operations and generating control inputs according the user's operations. The communication interface establishes communications with the computer 710 and transmits the control inputs to the cloud gaming process 712 of the computer 710 via the network 730. When the second process generates the second multimedia content items, the second process also receives the control input and communicates, based on the control input, with the first process by injecting code within the first process. The second process creates the overlay surface based on the received control input. In an embodiment, the first process performs one or more rendering operations, and the second process hooks the first process at the end of each said rendering operation, causing the first process to actively call the code injected by the second process.

Figure 11:
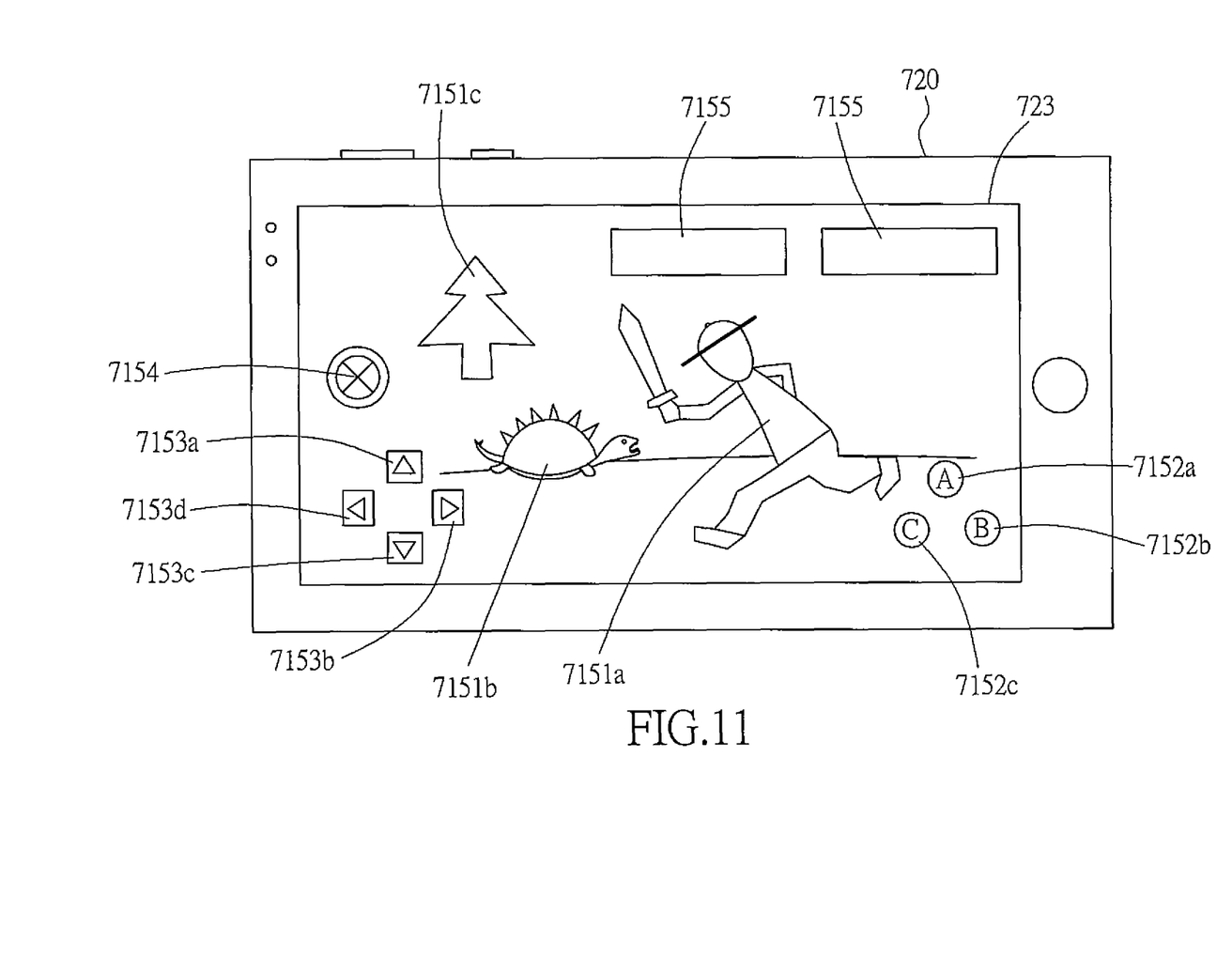
FIG. 11 is a schematic diagram showing an image of blended video content displayed on a client device, in accordance with an embodiment of the present invention.

FIG. 11 is a schematic diagram showing an image of blended video content displayed on a client device, in accordance with an embodiment of the present invention. In this embodiment, the client device 720 can be, but not limited to, a smart phone, a digital tablet or a computer equipped with a touch screen (also referred as the display 723). The touch screen (display 723) not only can be used to display the decoded target image, but also can be operated by a user to generate control inputs which are sent to the cloud gaming process 712 of the computer 710. In the embodiment shown in FIG. 11, the first multimedia content items 7151, 7152, 7153 of primary multimedia source 7110 generated by the game process 711 comprises a plurality of graphical items 7151*a*, 7151*b*, 7151*c*, and a plurality of virtual control buttons 7152*a*, 7152*b*, 7152*c*, 7153*a*, 7153*b*, 7153*c*, 7153*d*. These graphical items 7151*a*, 7151*b*, 7151*c* and virtual control buttons 7152*a*, 7152*b*, 7152*c*, 7153*a*, 7153*b*, 7153*c*, 7153*d* are generated by the game process 711. The graphical items 7151*a*, 7151*b*, 7151*c* only present graphical objects and scenes of the decoded target image, however, the virtual control buttons 7152*a*, 7152*b*, 7152*c*, 7153*a*, 7153*b*, 7153*c*, 7153*d* not only present graphical buttons, but also defines input features at locations where they presented. When the user touches one of the virtual control buttons 7152*a*, 7152*b*, 7152*c*, 7153*a*, 7153*b*, 7153*c*, 7153*d* on the touch screen (display 723), a control input corresponding to the touched button will be generated and then transmitted to the computer 710 located remote from the client device 720. The second multimedia content items 7154, 7155 of secondary multimedia source 7120 generated by the cloud gaming process 712 comprises one or more graphical items (second multimedia content item 7155) and virtual control buttons (second multimedia content item 7154). These second multimedia content items 7154, 7155 are add-on features but not built-in features of the game application. The graphical items (second multimedia content item 7155) can be graphical objects such like extra content, cloud-gaming specific content, and advertisement. The advertisement can be either interactive or non-interactive. If the advertisement is interactive, then a hyperlink (e.g., URL link) will be activated when the user touches the location of the advertisement in order to direct the user to a web-site related to the advertisement. The virtual control buttons (second multimedia content item 7154) can be user interface, interactive control, or device control interface customized to fit one or more particular devices. The virtual control buttons (second multimedia content item 7154) not only present graphical buttons, but also defines input features at locations where they presented. When the user touches one of the virtual control buttons (second multimedia content item 7154) on the touch screen (display 723), a control input corresponding to the touched button will be generated and then transmitted to the cloud gaming process 712 of computer 710 located remote from the client device 720. One of the feature of such virtual control buttons (second multimedia content item 7154) provided by the cloud gaming process 712 may be, but not limited to, activating a special feature which are equivalent to serially press some of the virtual control buttons 7152a, 7152b, 7152c, 7153a, 7153b, 7153c, 7153d. For example, simply pressing the button "X" (second multimedia content item 7154) will activate a special attack movement of the graphical item 7151a which otherwise can also be activated by laboriously pressing the buttons "A" (7152a), "B" (7152b) and "A" (7153a) sequentially within a very short period of time. When the cloud gaming process 712 receives a control input coming from the client device 720, the cloud gaming process 712 determines whether the control input is generated by touching the first multimedia content items 7152a, 7152b, 7152c, 7153a, 7153b, 7153c, 7153d of the game process 711 or the second multimedia content items 7154, 7155 of the cloud gaming process 712. If the control input is generated by touching the first multimedia content items 7152a, 7152b, 7152c, 7153a, 7153b, 7153c, 7153d, then the input control is directly forwarded to the game process 711 for controlling the game process 711. If the control input is generated by touching the second multimedia content items 7154, 7155, then the cloud gaming process 712 will determine what feature to be activated by the input control, and then the cloud gaming process 712 activates the determined feature in order to either: generate corresponding input controls and send them to the game process, create new second multimedia content item, or modify, delete or move existing second multimedia content item.

Although a few exemplary embodiments have been described above, one skilled in the art will understand that many modifications and variations are possible without departing from the spirit and scope of the present invention. Accordingly, all such modifications and variations are intended to be included within the scope of the claimed invention.

What is claimed is:

1. A method for overlaying multi-source media in VRAM, said method being applicable to a computer and comprising:
   providing a computer, said computer at least comprising a central processing unit (CPU), a system random access memory (SRAM), and a graphic processing unit (GPU) having a video random access memory (VRAM) built therein;
   said computer utilizing a first process to generate a video content, said video content containing at least one first multimedia content item generated by the first process;
   said GPU capturing said first multimedia content item of said video content generated by said first process and directly storing the captured first multimedia content item into a VRAM location of said VRAM;
   utilizing a second process to generate at least one second multimedia content item; said second process creating a compatible overlay surface on the VRAM location; said compatible overlay surface containing at least one said second multimedia content item; and
   said GPU directly blending said compatible overlay surface created by said second process to said video content generated by the first process and storing the blended video content into a frame buffer of said VRAM without the need to transfer said first multimedia content item and said second multimedia content item to the SRAM; wherein a video storage format of the compatible overlay surface is compatible to the video storage format of the blended video content stored in said frame buffer.

2. The method of claim 1, wherein:
   at the step of utilizing a second process to generate at least one second multimedia content item, the second process receives a control input and communicates, based on the control input, with the first process by injecting code within the first process; the second process creates said overlay surface based on the received control input;
   the first process performs one or more rendering operations, and the second process hooks the first process at the end of each said rendering operation, causing the first process to actively call the code injected by the second process.

3. The method of claim 2, wherein, the first process is a game process initiated by a game application; the second process is a cloud gaming process; the cloud gaming process uses process interception to run within the game application; the cloud gaming process provides one or more of an on-screen keyboard, a virtual mouse, and dialog information, without modification of the game application.

4. The method of claim 2, wherein, said control input is generated by a client device remote from the computer; said client device sends said control input to the computer via a network; said computer retrieves and encodes said blended video content stored in said frame buffer and then transmits the encoded blended video content to the client device via the network; said client device then receives, decodes and displays the transmitted encoded blended video content.

5. The method of claim 2, wherein:
   an encode operation on the blended video content is performed by the GPU in the VRAM without the need to transfer said blended video content to the SRAM;
   the blended video content comprises at least one of the following: user interface, extra content, interactive control, cloud-gaming specific content, advertisement, and device control interface customized to fit one or more particular devices.

6. A system for overlaying multi-source media in VRAM, comprising:
   a computer, said computer at least comprising a central processing unit (CPU), a system random access memory (SRAM), and a graphic processing unit (GPU) having a video random access memory (VRAM) built therein;
   said computer utilizing a first process to generate a video content, said video content containing at least one first multimedia content item generated by the first process;

said system utilizing a second process to generate at least one second multimedia content item;

said GPU being configured to perform the following:

capturing said first multimedia content item of said video content generated by said first process and directly storing the captured first multimedia content item into a VRAM location of said VRAM;

creating a compatible overlay surface by said second process on the VRAM location; said compatible overlay surface containing at least one said second multimedia content item; and directly blending said compatible overlay surface created by said second process to said video content generated by the first process and storing the blended video content into a frame buffer of said VRAM without the need to transfer said first multimedia content item and said second multimedia content item to the SRAM; wherein a video storage format of the compatible overlay surface is compatible to the video storage format of the blended video content stored in said frame buffer.

7. The system of claim 6, wherein:

the second process receives a control input and communicates, based on the control input, with the first process by injecting code within the first process; the second process creates said overlay surface based on the received control input;

the first process performs one or more rendering operations, and the second process hooks the first process at the end of each said rendering operation, causing the first process to actively call the code injected by the second process.

8. The system of claim 7, wherein, the first process is a game process initiated by a game application; the second process is a cloud gaming process; the cloud gaming process uses process interception to run within the game application;

the cloud gaming process provides one or more of an on-screen keyboard, a virtual mouse, and dialog information, without modification of the game application.

9. The system of claim 7, wherein, said control input is generated by a client device remote from the computer; said client device sends said control input to the computer via a network; said computer retrieves and encodes said blended video content stored in said frame buffer and then transmits the encoded blended video content to the client device via the network; said client device then receives, decodes and displays the transmitted encoded blended video content.

10. The system of claim 7, wherein:

an encode operation on the blended video content is performed by the GPU in the VRAM without the need to transfer said blended video content to the SRAM;

the blended video content comprises at least one of the following: user interface, extra content, interactive control, cloud-gaming specific content, advertisement, and device control interface customized to fit one or more particular devices.

11. A computer program product in a non-transitory computer-readable medium comprising instructions executable by a computer, said computer at least comprising a central processing unit (CPU), a system random access memory (SRAM), and a graphic processing unit (GPU) having a video random access memory (VRAM) built therein; said instructions being executable by said computer to perform the following:

said computer utilizing a first process to generate a video content, said video content containing at least one first multimedia content item generated by the first process;

said GPU capturing said first multimedia content item of said video content generated by said first process and directly storing the captured first multimedia content item into a VRAM location of said VRAM;

utilizing a second process to generate at least one second multimedia content item; said second process creating a compatible overlay surface on the VRAM location; said compatible overlay surface containing at least one said second multimedia content item; and said GPU directly blending said compatible overlay surface created by said second process to said video content generated by the first process and storing the blended video content into a frame buffer of said VRAM without the need to transfer said first multimedia content item and said second multimedia content item to the SRAM; wherein a video storage format of the compatible overlay surface is compatible to the video storage format of the blended video content stored in said frame buffer.

12. The computer program product of claim 11, wherein:

the second process receives a control input and communicates, based on the control input, with the first process by injecting code within the first process; the second process creates said overlay surface based on the received control input;

the first process performs one or more rendering operations, and the second process hooks the first process at the end of each said rendering operation, causing the first process to actively call the code injected by the second process.

* * * * *